United States Patent
Wan et al.

(10) Patent No.: US 9,264,373 B2
(45) Date of Patent: Feb. 16, 2016

(54) ADAPTIVE FRAME STRUCTURE FOR TDD POINT-TO-POINT WIRELESS TRANSMISSION

(75) Inventors: Lei Wan, Beijing (CN); Lars Robert Looström, Mölndal (SE); Qing Lin, Beijing (CN)

(73) Assignee: Telefonaktiebolaget L M Ericsson (Publ), Stockholm (SE)

(*) Notice: Subject to any disclaimer, the term of this patent is extended or adjusted under 35 U.S.C. 154(b) by 1020 days.

(21) Appl. No.: 11/994,491

(22) PCT Filed: Jul. 1, 2005

(86) PCT No.: PCT/SE2005/001056
§ 371 (c)(1),
(2), (4) Date: Mar. 4, 2008

(87) PCT Pub. No.: WO2007/004923
PCT Pub. Date: Jan. 11, 2007

(65) Prior Publication Data
US 2009/0046606 A1    Feb. 19, 2009

(51) Int. Cl.
*H04J 3/00* (2006.01)
*H04L 12/805* (2013.01)
*H04J 3/06* (2006.01)
*H04L 12/801* (2013.01)
*H04L 1/00* (2006.01)

(52) U.S. Cl.
CPC .............. *H04L 47/36* (2013.01); *H04J 3/0682* (2013.01); *H04L 47/10* (2013.01); *H04L 1/0007* (2013.01)

(58) Field of Classification Search
USPC ..................... 370/280, 351; 379/3
See application file for complete search history.

(56) References Cited

U.S. PATENT DOCUMENTS

| | | | |
|---|---|---|---|
| 5,461,661 A * | 10/1995 | Buttle | 379/3 |
| 6,553,020 B1 * | 4/2003 | Hughes et al. | 370/347 |
| 7,787,447 B1 * | 8/2010 | Egan et al. | 370/389 |
| 2002/0141345 A1 * | 10/2002 | Szviatovszki et al. | 370/238 |
| 2003/0026215 A1 * | 2/2003 | Schafer | 370/280 |
| 2004/0032835 A1 | 2/2004 | Majidi-Ahy et al. | |
| 2004/0190490 A1 * | 9/2004 | Randriamasy et al. | 370/351 |
| 2008/0198814 A1 * | 8/2008 | Wengerter et al. | 370/336 |

FOREIGN PATENT DOCUMENTS

| | | | | |
|---|---|---|---|---|
| EP | 1347601 A2 * | 9/2003 | | H04L 12/56 |
| JP | 2000-049757 A | 2/2000 | | |
| WO | WO 2005/027537 | 3/2005 | | |

OTHER PUBLICATIONS

NTT DoCoMo, Physical Channel Structures for Evolved UTRA, 3GPP TSG RAN WG1 Meeting #41, R1-050464, Athens Greece, May 9-13, 2005, entire document.*

(Continued)

*Primary Examiner* — Joseph Bednash

(57) ABSTRACT

The present invention relates to an arrangement for point-to-point transmission over links between first and second link (end) terminals in a system implementing time division duplex (TDD) and wherein information is sent over the links in frames divided into time slots. It is adapted to determine the lengths of the frames on a per link basis using one or more link parameters, the frame length hence being variable.

12 Claims, 7 Drawing Sheets

(56) References Cited

OTHER PUBLICATIONS

Lettieri et al. "Adaptive Frame Length Control for Improving Wireless Link Throughput, Range and Energy Efficiency", Mar. 1998, IEEE, included as IDS labelled AA on Jun. 2, 2011.*
Stojanovski, S., et al; Proceedings of 4th International Conference on Broadband Communications 1998 "Impact of Time Division Duplexing on Delay Variation in Slotted Access Systems" ISBN 0-412-84410-9.
Lettieri P. et al. Adaptive frame length control for improving wireless link throughput, range, and energy efficiency. INFOCOM '98, Seventeenth Annual Joint Conference of the IEEE Computer and Communications Societies. Proceedings. IEEE San Francisco, CA, USA, Mar. 29-Apr. 2, 1998, New York, NY, USA, IEEE, US, vol. 2, Mar. 29, 1998, pp. 564-571, XP010270390.
Gangsheng W. et al. Optimal Broadcast Scheduling in Packet Radio Networks Using Mean Field Annealing. IEEE Journal on Selected Areas in Communications, IEEE Service Center, Piscataway, US, vol. 15, No. 2, Feb. 1, 1997, XP011054607.

* cited by examiner

| L | 10km | 20km | 30km | 40km | 50km | 60km | 70km | 80km | 90km | 100km | 110km | 120km |
|---|------|------|------|------|------|------|------|------|------|-------|-------|-------|
| $N_{hop}$ | 5 | 4 | | | 3 | | | 2 | | | | 1 |
| BITRATE (Mbps) | 9.53 | 9.95 | 8.59 | 9.70 | 9.11 | 9.68 | 9.45 | 9.22 | 8.76 | 8.52 | (8.06) | (7.83) |
| $T_{frame}$ (ms) | 0.9 | 1.3 | 1.1 | 1.8 | 1.7 | | | 2.5 | | | | |
| TTG (ms) | 0.1081 | 0.1541 | 0.2498 | 0.3086 | 0.3585 | 0.4648 | 0.5106 | 0.5564 | 0.6480 | 0.6938 | 0.7854 | 0.8312 |
| $N_{DLsym}$ | 17 | 24 | 19 | 33 | 29 | 44 | 43 | 42 | 40 | 39 | 37 | 36 |

*Fig. 6*

| L | 10km | 20km | 30km | 40km | 50km | 60km | 70km | 80km | 90km | 100km | 110km | 120km |
|---|------|------|------|------|------|------|------|------|------|-------|-------|-------|
| $N_{hop}$ | | | | | | 3 | | | | | | |
| BITRATE (Mbps) | 11.23 | 10.65 | 10.22 | 9.70 | 9.11 | (8.05) | (7.20) | (6.17) | (4.42) | (2.77) | (0) | (0) |
| $T_{frame}$ (ms) | 2 | 2 | 2 | 1.8 | 1.7 | 1.6 | 1.4 | 1.3 | 1.2 | 1 | 0.9 | x |
| TTG (ms) | 0.1022 | 0.1938 | 0.2587 | 0.3086 | 0.3585 | 0.4541 | 0.5040 | 0.5539 | 0.6495 | 0.6994 | 0.7951 | x |
| $N_{DLsym}$ | 41 | 39 | 37 | 33 | 29 | 24 | 20 | 16 | 11 | 7 | 2 | x |

*Fig. 7*

ADAPTIVE FRAME STRUCTURE FOR TDD POINT-TO-POINT WIRELESS TRANSMISSION

This application claims the benefit of PCT Patent Application No. PCT/SE2005/001056, filed Jul. 1, 2005, the disclosure of which is fully incorporated herein by reference.

FIELD OF THE INVENTION

The present invention relates to an arrangement for point-to-point transmission over links between first and second link particularly (end) terminals in a system implementing time division duplex wherein information is sent over the links in frames which are divided into time slots.

The invention also relates to a method for, in a communication system using time division duplex, setting up a point-to-point transmission link, wherein information is sent in frames between a first link end terminal and a second link end terminal.

Still further the invention relates to a frame structure for communication in a point-to-point system implementing time division duplex (TDD). Particularly the transmission is wireless.

STATE OF THE ART

Point-to-point transmission, particularly wireless transmission, requires a high spectrum efficiency as well as a long transmission distance. However, mostly the transmit power is limited which limits the transmission distances associated with one hop. Point-to-point systems therefore, in order to support long transmission distances, are designed to support multiple (serial) hops.

Radio resources have become limited, particularly for frequency division duplex (FDD) due to the fact that it is difficult to find allocated pairs of uplink and downlink bands. Therefore TDD is a technique that has become more and more widely used for point-to-point wireless transmissions. Existing TDD point-to-point systems are based on use of a fixed frame length which can support middle spectrum efficiency and a limited number of hops per link.

In TDD-systems, the same frequency band is used for uplink and downlink traffic, and a gap, also called transmission/reception transition gap (TTG) has to be introduced which is determined by the hop round-trip delay. The introduction of this TTG, however, causes a significant spectral resource loss. In addition thereto, the spectral resource loss is larger for a shorter frame length. On the other hand there is a very tight link transmission delay requirement. This limits the hop transmission delay and the number of hops per link. The more hops the link supports, the shorter frame lengths are required. Therefore a TDD point-to-point system has to select a frame length based on a compromise between high spectrum efficiency and the ability to support a sufficient number of hops, i.e., to find a proper balance between spectrum efficiency and the number of hops supported.

Known TDD point-to-point systems are based on the use of a fixed frame length and they can not support high spectrum efficiency for wireless applications. In addition thereto the number of hops per link is limited. Consequently known systems involve large losses as far as efficiency is concerned and the delay and transmission particularly gives rise to problems in so called Third Generation Partnership Project Project (3GPP) systems (3G systems) since in such systems there are strict requirements on the delay for example between base stations and the delay causes problems for example in Radio Network Controllers (RNCs). Currently the requirements as to the delay between base stations is about 5 seconds.

The problems are even more pronounced when there are several hops in series.

SUMMARY OF THE INVENTION

What is needed is therefore an arrangement as initially referred to through which high spectrum efficiency can be achieved. Still further an arrangement is needed through which a sufficient number of hops, or a comparatively large number of hops, can be supported. Particularly an arrangement is needed through which high spectrum efficiency as well as a sufficient number of hops can be supported at the same time, i.e., without the "quality" of one of the features ruling out the other. Still further an arrangement is needed which supports a high spectrum efficiency for many different applications and in different environments or under various geographical conditions. Still further an arrangement is needed through which the delay can be reduced to the appropriate or needed extent, particularly such as to fulfill requirements in 3G-systems. Even more particularly an arrangement is needed through which the hop delay can be reduced as much as possible.

Particularly an arrangement is needed which is flexible and which can be adapted to various different conditions and/or requirements. Still further an arrangement is needed which is efficient and such as to enable good transmission conditions as far as resource usage, quality etc. is concerned also in cases where it is difficult to find a direct LOS (Line Of Sight) link or when there are long transmission distances and/or limited transmit power.

A method is also needed through which one or more of the above mentioned objects can be achieved. Still further a frame structure is needed through which one or more of above mentioned objects can be achieved.

Therefore, an arrangement as initially referred to is provided which is adapted to determine the lengths of the frames on a per link basis using one or more link parameters, the frame length hence being variable. Particularly one or more transmission requirements are given and the lengths of the frames are determined such that when one or more link of said requirements is/are met, another link parameter value can be optimized, e.g. maximized or minimized.

In one embodiment two link transmission requirements relate to the end-to-end roundtrip delay and the number of hops and the arrangement is adapted to determine the lengths of the frames of a link such as to maximize the data bit-rate. Alternatively requirements are given for service end-to-end roundtrip delay and data bit-rate, and it is adapted to maximize the number of hops. Requirements may alternatively be given for the number of hops and the data bit-rate, the arrangement being adapted to minimize the end-to-end roundtrip delay, the required delay for a transmission from one link end terminal to another.

A link parameter may comprise the distance between a respective first and a second link end terminal. The distance information is particularly provided in an information holding means in or in communication with the first and/or second link end terminal. Preferably means are provided for, on a per link basis, measuring or detecting the distance or the transmitted delay.

A second parameter may comprise the number of hops required for a particular link. Particularly the arrangement is adapted to determine the hop lengths of a number of serial hops required for the distance and the minimum frame TTG of each frame is determined.

In some implementations a third parameter comprises the maximum hop distance, and the arrangement is adapted to select the maximum frame lengths to maximize a requirement comprising the transmission efficiency given the third and second parameters i.e. the maximum hop distance and the required number of hops.

In one implementation, each frame comprises a number of time slots, the arrangement is adapted to vary the frame length by varying the number of time slots in the frame. Alternatively, each frame comprising a number of time slots, each time slot comprising a number of symbols, the arrangement is adapted to vary the frame length by means of variation of the number of symbols in each time slot, or in each frame. Particularly the frame lengths are substantially continuously variable. The arrangement can be adapted to vary or adapt uplink and/or downlink frame lengths. The links may comprise microwave links or millimeter wave links. The links may particularly comprise optical links. Each link end terminal particularly comprises a receiving/transmitting antenna, a traffic interface and a managing interface, said managing interface handling distance establishment and parameter dependent adaptive setting of frame lengths. The traffic interface may comprise an SDH-interface or an STM-interface or similar.

In an advantageous implementation the arrangement is adapted to automatically or at least partly automatically adapt the frame lengths on a per link basis.

In some implementations, the lengths of the hops forming an end-to-end link are different, at least for some of the hops and the hop lengths are substantially fixed. Additionally TTG and/or receive/transmission transition gap (RTG) may be adaptable for optimizing one or more parameters when one or more parameters are to fulfill requirements. The first and/or second link end terminals) may be base station(s), but this is of course not necessarily the case. An arrangement according to the invention may be used for wireless transmission e.g. in a 3G-system, e.g. UMTS, GPRS.

A method as initially referred to is also provided which comprises the steps of; establishing the distance between the first and the second link end terminal or between a number of the respective link terminals; determining the number of hops to be used, and/or establishing the required maximum end to end delay requirements, and/or bit-rate requirements; adapting the lengths of the frames of the link such that the transmission efficiency can be optimized as far as one or more transmission link requirements are concerned.

In order to optimize the transmission efficiency the frame lengths are particularly so selected that the link end-to-end delay is minimized. The frame lengths of a link may even more particularly be selected based on one or more of the parameters, maximum hop distance, round trip delay per hop, number of hops, transmit power, service specific requirements regarding throughput or other parameters.

In one implementation the method comprises the step of; selecting frame lengths such as to maximize transmission bit-rate. Alternatively it comprises the steps of; selecting frame lengths such that the number of hops is maximized, and/or the transmission distance can be maximized, and/or the end-to-end roundtrip delay can be minimized. A method may be used in a 3G system, or any other system where similar problems may occur, particularly wireless.

Still further a frame structure for wireless communication in a point-to-point system including first and second link end terminals, is provided. Said frame structure being variable or adaptive and the lengths of the frames are adapted to be varied or adapted depending on one or more link transmission parameters on a per link basis such that one or more other link parameters can be optimized, e.g. minimized' or maximized.

BRIEF DESCRIPTION OF THE DRAWINGS

The invention will in the following be further described, in a non-limiting manner, and with reference to the accompanying drawings, in which:

FIG. 6 shows an example on a table for one embodiment in which the frame length setting is varied, with maximizing the supported number of hops, FIG. 7 shows a table illustrating examples how the frame length setting can be varied when the number of hops is fixed to three, with maximizing the transmitted bit-rate.

DETAILED DESCRIPTION OF THE INVENTION

Figure 1A:
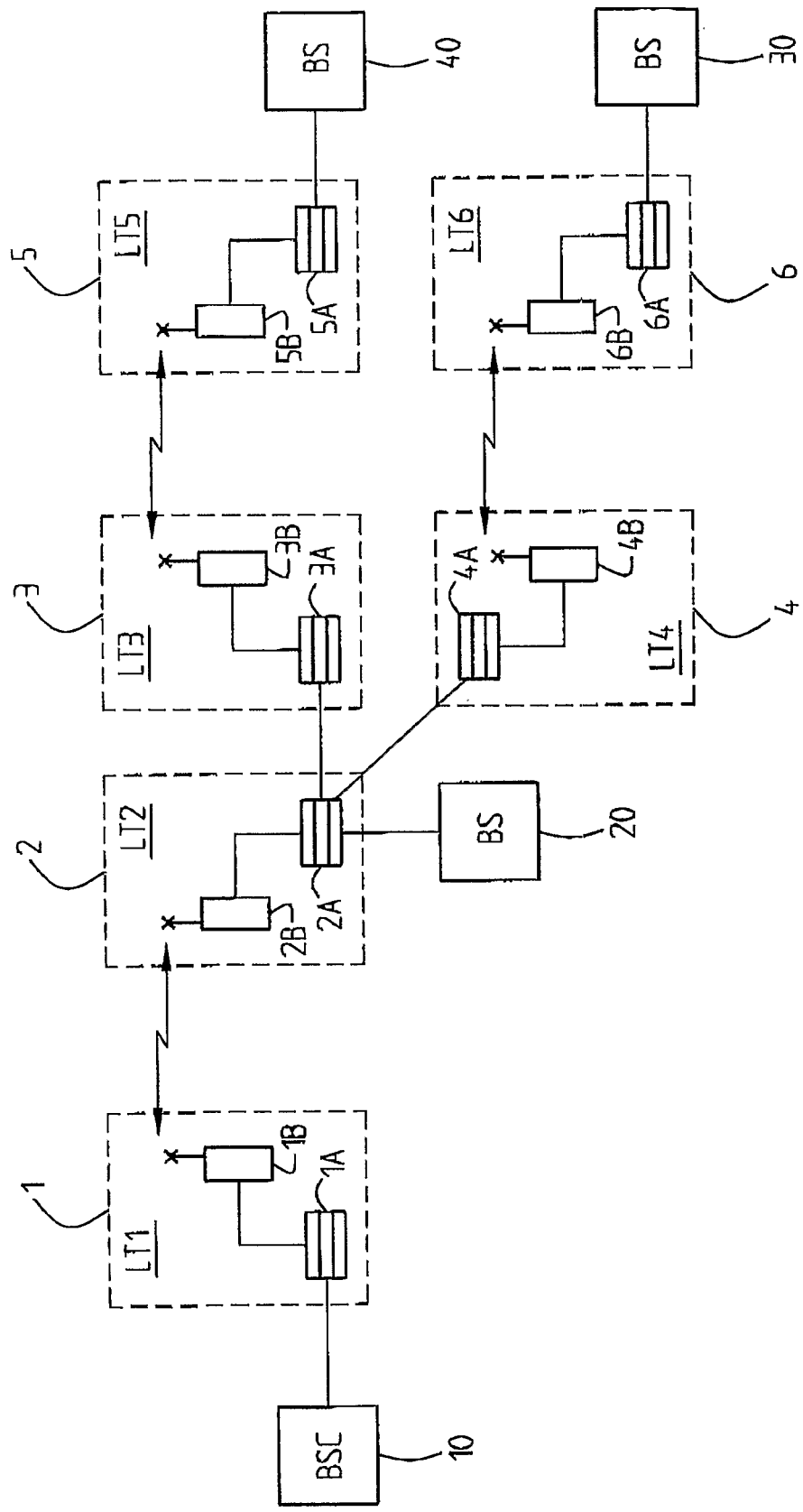
FIG. 1A is a block diagram showing a system in which the inventive concept can be implemented.

According to the inventive concept an adaptive frame structure, or a variable frame length for TDD point-to-point systems is suggested. The basic idea is to determine or establish the frame length based on one or more parameters, here also called link parameters, in order to meet one or more requirements. One link parameter is the distance between the two link end points and according to the invention the distance is measured or determined in some other appropriate way. Information may e.g. be automatically provided, or measured, e.g. a signal may be sent out and detected etc. There are several possibilities as to how to determine the distance. Another parameter is the number of hops that is required or desired. This may also be the determined case by case. In point-to-point systems, both the transmission distance and the required number of hops can vary considerably due to different application requirements, geographical conditions etc.

As discussed above, in known TDD systems wherein a fixed frame length is selected, it is impossible to reach a high efficiency and to meet various application requirements. The advantage of a point-to-point system is that there is no synchronization requirement among different links which, according to the present invention, makes it reasonable to have a distance dependent or variable frame length.

According to the present invention particularly three or more requirements or constraints can be considered. Generally there are three main constraints i.e. parameters that should fulfill requirements. One is the maximum hop distance, which determines the minimum TTG in the frame.

Another requirement or another feature which may have to meet a requirement, or a form of constraint, is the required number of hops. In addition thereto there may be a requirement of the end-to-end delay for example for a certain service. Particularly the end-to-end delay requirement and the required number of hops may limit the maximum hop delay, and hence also the frame length. In one advantageous embodiment a maximum frame length is selected in order to maximize the transmission efficiency. There are however also other possibilities.

According to the invention the frame length and/or RTG and/or TTG of a TDD point-to-point system are variable link by link. Particularly it can be adapted to the maximum hop distance of each link and/or to the roundtrip delay for each hop which for example may be measured. It may also be adaptive to the number of hops of which one link consists. Particularly the frame length is selected to maximize the transmission bit-rate, i.e. the throughput, with the link distance being subject of a requirement or a constraint, the required minimum throughput number of hops required within the link.

For links with very long distances or limited transmit power and for which the required throughput can not be supported through the required number of hops, the maximum number of hops that can satisfy the required throughput requirements are advantageously selected.

For links with very long distances or limited transmit power where the required throughput cannot be supported even by a single hop, a single hop will be used and the frame length is selected such as to maximize the transmission bit-rate.

FIG. 1A illustrates a system with some link terminals, hops and how a link can be implemented. In a typical network microwave links connect base stations with a Base Station Controller (BSC) (or an RNC Radio Network Controller). The network can be in cascade stars or rings. In FIG. 1A an example is shown with two hops in cascade in a simple star which actually simply may be called a traffic split. In a European Telecommunications Standards Institute (ETSI) Plesiochronous Digital Hierarchy (PDH) network, the traffic is structured in E0, E1, (E2) and E3. Some traffic is dropped and some traffic can be transmitted onto another link terminal. A real network may have hundreds of nodes and a cascade deep of up to five hops or in some cases even more (or less). It should be clear that the inventive concept of course is not limited to such networks but it can be used for any network with any number of nodes, hops etc. and it does of course not have to be base station controllers, base stations etc. or RNCs, but generally nodes or terminals where a transmission is desired between terminals. It may even be a PC with a traffic interface; particularly it depends on the traffic interface that is used, a PDH interface, or an Ethernet interface or an E1, E2, E3 interface, or, for USA a T1, T2, T3 interface or for Japan a J-interface etc.

Important parameters are, here, the total delay from BSC to BS, the capacity in Mbps, the number of hops that it is possible to use.

When TDD frames are used, the frame structure has a great influence on the possible performance.

According to the present invention, a flexible frame length is used to achieve the best performance combination for a particular network.

Hence, in FIG. 1A it is shown a link terminal (here a link end terminal) LT 1, at, or connected to a BSC 10; LT 1 consists of an indoor unit 1A and outdoor unit 1B. The outdoor unit 1B includes antennas receiving/transmitting frames over the air.

It should be clear that the indoor and outdoor units respectively do not have to be placed indoors or outdoors even if they mostly are, alternatively both units may be placed "indoors" or "outdoors" or vice versa; the concepts "in-" and "out-," are used for reasons of simplicity. A first hop is here defined between link terminal LT 1 and a second link terminal LT 2 2 also with indoor and outdoor units 2A, 2B and which here is connected to a base station BS 20. LT 2 is connected to a link terminal LT 3 3 and a link terminal LT 4 4 with indoor and outdoor units respectively 3A, 3B, 4A, 4B and some of the traffic can be connected to LT 3 and some other traffic to LT 4. From LT 3 3 to LT 5 5 some traffic is transmitted over another (second) hop, whereas between LT 4 4 and LT 6 6 there is another hop. LT 6 6 is connected to BS 30, whereas LT 5 5 is connected to BS 40.

Figure 1B:
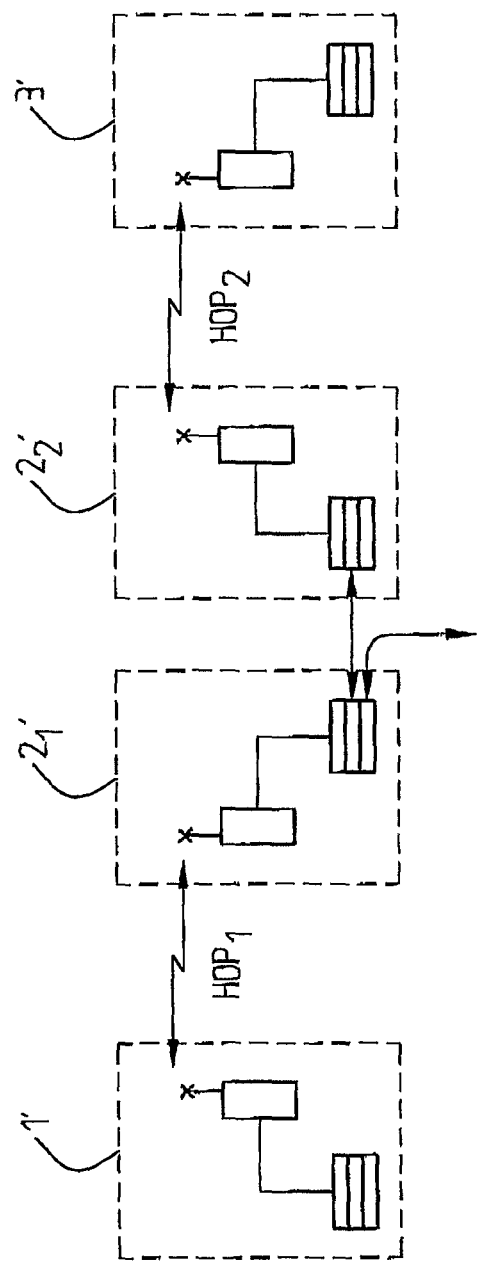
FIG. 1B is a block diagram showing a link with two hops.

FIG. 1B shows an example of a microwave link with two hops in cascade. As explained above, between LT 1' and LT 2 1' it is a first hop (hop) between the two terminals. At LT 2, some of the traffic may be connected to the traffic interface of LT 2$_2$' whereas some other traffic is dropped as indicated through the arrow. Between LT 2$_2$' and LT 3' there is a second hop (hop$_2$) and for the two-hop link LT 1' and LT 3' form the respective link end terminals.

Figure 2:
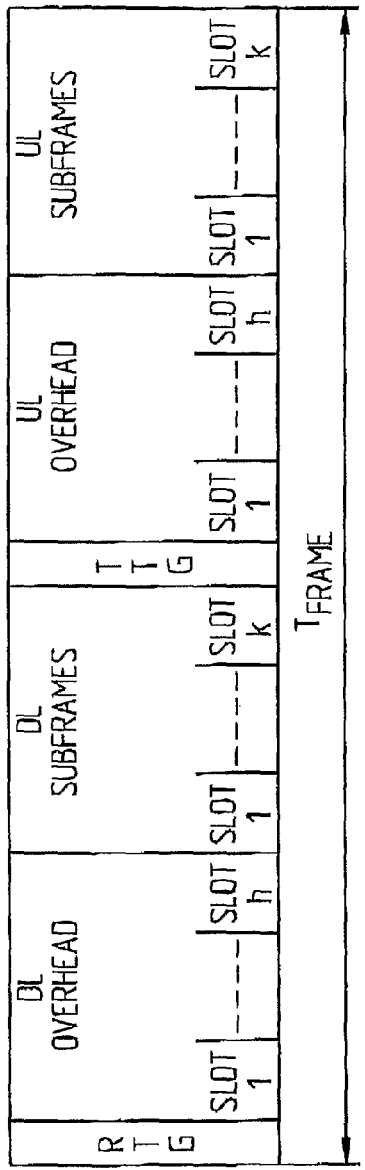
FIG. 2 shows a general example of a frame structure to which the inventive concept can be implemented.

FIG. 2 illustrates a general TDD frame structure with a RTG, with downlink (DL) overhead comprising, here, slots 1-$h$, the downlink (DL) sub-frames with slots 1-$k$, the transmission/receiving transition gap TTG and the uplink (UL) overhead with slots 1-$h$ and the uplink (UL) sub-frames with slots 1-$k$. According to the inventive concept the frame length of the frame structure $T_{frame}$ is variable. In one embodiment the number of slots on the uplink/downlink can be varied or adapted depending on parameters and requirements as discussed above but also the RTG and/or TTG can be varied. It is also possible to vary the frame length on symbol level, i.e. vary the number of symbols on the UL and/or DL since particularly each slot comprises a number of symbols which means that the frame length can be varied almost continuously.

In the following a way of calculating or determining the frame length will be discussed with reference to applicable requirements (constraints) and parameters for one embodiment. It is here supposed that the inputs are the following:

the required number of hops: $N_{hop}$,
the maximum hop distance: $L_{hopmax}$,
the required minimum information bit-rate of the particular service: R,
the maximum total end-to-end delay that is permitted: $D_{tot}$,
the pre-, and post processing delay of each hop: $T_{proc\ hop}$,
RTG, particularly limited by hardware design
the duration of one slot: $T_{slot}$,
the number of information of bits per slot: $N_{ib}$ (slot),
the maximum frame length that is permitted: $T_{maxframe}$,
the number of slots in both uplink and downlink sub-frames, which are
allocated for overhead pilots and frame control headers: $N_{oh}$.

Based on the inputs referred to above, the necessary middle variables can be calculated as:
the limited maximum delay of each hop: $D_{tot\ hop} = D_{tot}/N_{hop}$,
the maximum roundtrip transmission delay for each hop can be calculated as: T2D(hop)=2*L/3E8,
the number of downlink slots is given by: $N_{DLslot}$=floor(($T_{frame}$−2*RTG−T2D(hop))/2/$T_{slot}$.

The constraints of the delay and throughput can be expressed as: TTG≥T2D(hop)+RTG, $T_{tothop} \geq T_{frame}/2 + T2\ D\ (hop) + T_{prochop}$, i.e $T_{frame} \leq 2*(T_{tothop} - T2\ D\ (hop) - T_{prochop})$, with the corresponding maximum bit-rate:

bitrate=$(N_{D1slot} - N_{oh})*N_{ib}(slot)/T_{frame} \geq R$.

The steps which should be performed in order to calculate the frame length and TTG are in this implementation the following:

Step 1: assuming that $N_{hop}$ can be supported, the maximum frame length $T_{fmax}$ can be calculated based on the delay constraints or delay requirements:

$T_{fmax} = \min(2*(T_{tothop} - T2D(hop) - T_{prochop}), T_{maxframe})$.

Step 2: check whether the bit-rate R can be supported with the above $T_{fmax}$:

(floor $((T_{fmax} - 2*RTG - T2D\ (hop))/2/T_{slot}) - N_{oh})*N_{ib}(slot)/T_{fmax} \geq R$?, if yes, the frame length is set to $T_{fmax}$: $T_{frame} = T_{fmax}$, if not, and if $N_{hop} > 1$, the bit-rate R cannot be supported by $N_{hop}$ hops. Therefore $N_{hop} - 1$ is tried instead, i.e. $N_{hop} = \max(N_{hop} - 1, 1)$, and steps 1, 2 are repeated.

If not and $N_{hop} = 1$, the bit-rate R cannot be supported even by a single hop and then the single hop will be used.

Step 3: the maximum bit-rate that is supported by $T_{frame}$ and $N_{hop}$ is recalculated as:

R=(floor $((T_{fmax} - 2*RTG - T2D(hop))/2/T_{slot} - N_{oh})*N_{ib}(slot)/T_{fmax}$, finally, in Step 4: TTG is calculated as: $TTG = T_{frame} - RTG - 2*N_{DL}(slot)*T_{slot}$.

Figure 3:
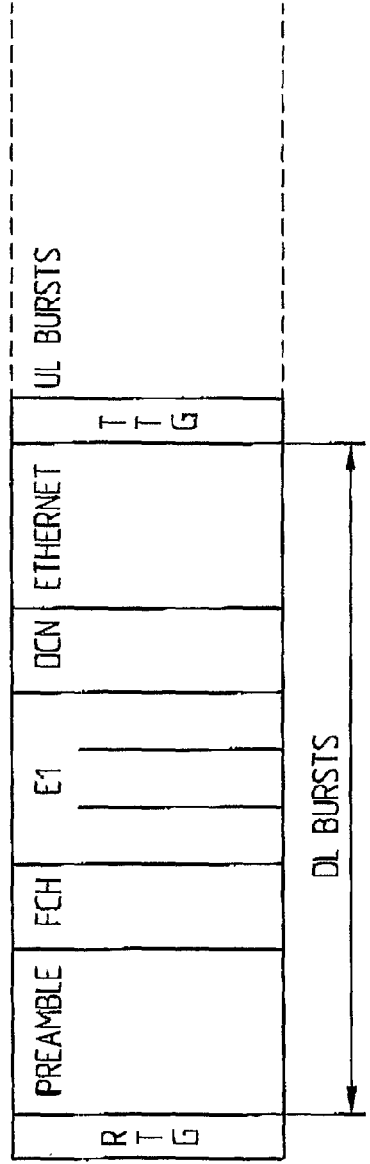
FIG. 3 shows an example of a particular frame structure to which the inventive concept can be implemented.

FIG. 3, shows an example of a frame structure to which the inventive concept can be implemented, a downlink/uplink symmetric TDD frame structure. In this example it is a frame of a frame type 4×E1+2×64 kbps DCN+Ethernet, with an FCH is a Frame Control Header, DCN control signaling (64 kbps) data communication channel between terminals, the Ethernet data service implementing best effort communication and E1 is a 2.048 Mbps data service.

Figure 4:
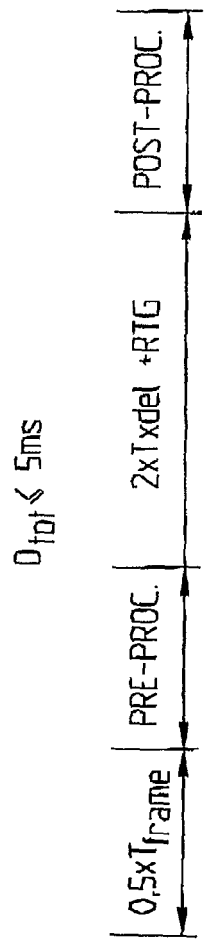
FIG. 4 is a figure in association with which it is explained how the frame length is calculated according to one embodiment in which some specific requirements are given.

FIG. 4 schematically illustrates an example wherein there is a requirement that the total delay may not exceed 5 ms. Another requirement is at the frame length should not exceed 2 ms and it is supposed that the distance is about 60 km. As an example it is supposed that $T_{frame}$ will be 2 ms, with the distance 20 km and the Tx delay 0.067 ms.

$D_{tot}$ will e.g. be $0.5*2+2*0.067+0.4825=5$ ms.

The hop delay will be 0.5 $T_{frame} + 2*D_{hop} +$ prepro+postpro.

$$TTG \geq 2*D_{hop} + RTG.$$

$T_{frame}$ and TTG are set in order to to maximize the spectrum efficiency. In this case TTG will be 0.4 ms and the throughput will be 8.928 Mbps=4*E1+11*64 kbps Ethernet.

Figure 5:
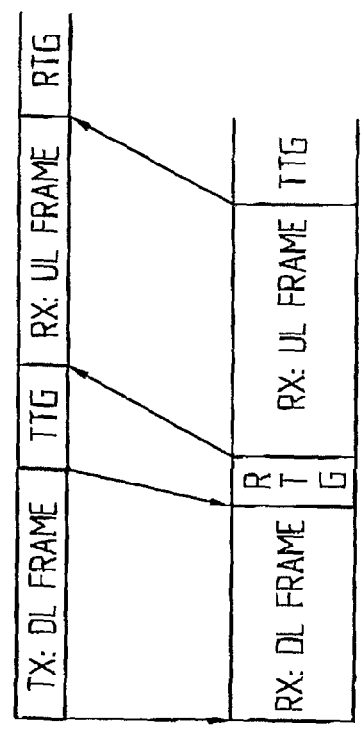
FIG. 5 shows an embodiment in which TTG can be varied.

FIG. 5 shows an embodiment comprising adaptive setting of TTG. In the figure T1 means one link (end) station and T2 means the other link (end) station between which the link is set up. T1 may for example be a BSC (Base Station Controller) and T2 may be a BS or T1 and T2 may both be BS: es or T1 may be a BS and T2 may be an SS (Subscriber Station) etc. Instead of the BSC there may be an RNC etc.

It is supposed that the input here is $T_{frame} = 2$ ms (selected), $T_{ofdmsym}$ (OFDM symbol)=22.9 μs, that the number of symbols per frame $N_{spf} = T_{frame}/T_{ofdm\ sym} = 87.3362$ and that RTG should be 20 μs (maximum). It is also supposed that the roundtrip delay $T_{2D}$ is measured. It is furthermore supposed that the requirements are given as the following constraint: $TTG \geq T_{2D} RTG$ and there should be an integral value number of downlink symbols equal to the number of uplink symbols and both number of symbols per frame=$(N_{spf} - RTG - TTG)/2$.

The output will then be $N_{DLsym}$=(the number of downlink symbols)=floor $((N_{spf} - RTG - TTG)/2)$, $TTG = N_{spf} - RTG - N_{DLsym}$.

In one implementation RTG is variable in order to provide for compensation to the selected (here) 2 ms frame length in case of a non-perfect uplink/downlink-synchronization. It should be clear that this merely be relates to one particular implementation with, in addition to adaptive frame length, also adaptive TTG setting.

With reference to FIG. 6 an example of adaptive frame length setting will be described wherein it is supposed that the maximum number of hops $N_{hopmax} = 5$.

First, however, in order to provide a table as in FIG. 6, definitions of inputs, middle variables and constraints will be given as well as the specific given values for some of he input parameters, here $D_{tot}$, $T_{tot}$, RTG symbol duration, number of information bits per symbol. As inputs are defined: the number of hops, $N_{hop}$, the maximum hop distance $L_{hopmax}$, RTG, here supposed to be 20 μs, the duration of one OFDM (Orthogonal Frequency Division Multiplex) symbol $T_{ofdmsym} = 22.9$ μs, the number of information bits per OFDM symbol, $M_{ifbs} = 576$.

The middle variables are $D_{tothop} = D_{tot}/N_{hop}$ which is the required maximum delay of each hop, the averaged roundtrip transmission delay of each hop, here $T_{2Dhop} = 2*L/3E8$. Finally $N_{DLsym}$=floor $((T_{frame} - 2*RTG - T_{2Dhop})/2/T_{OFDMsym})$ which is the number of downlink OFDM symbols.

In this case it is supposed that the constraints are: $TTG \geq T_{2Dhop} + RTG$, $T_{tothop} \geq T_{frame}/2 + T_{2Dhop} + T_{prochop}/$i.e. $T_{frame} \leq 2*(T_{tothop} - T_{2Dhop} - T_{prochop})$, the corresponding maximum bitrate=$(N_{DLsym} - 2)\ N_{ifbsym}/T_{frame} \geq 8\ 32$ Mbps=4*E1+2.64 kbps.

The following calculations are performed: $T_{fmax} = \min (2*(T_{tothop} - T_{2Dhop} - T_{prochop}), 2.5$ ms) and it is then compared if (floor $((T_{fmax} - 2*RTG - T_{2DhoP})/2/T_{ofdmsym}) - 2)*N_{ifbSym}/T_{fmax} \geq 8.32$ Mbps.

If yes, $T_{frame} = T_{fmax}$ and if not, $N_{hop} = \max (N_{hop} - 1, 1)$, perform new calculations, $TTG = N_{spf} - RIG - N_{DLsym}$. In this table of FIG. 6 it is supposed that $N_{hop}$ is limited to 5. The bitrates within parenthesis, 8.06 Mbps, 7.83 Mbps for the lengths 110 km, 120 km do not support 4*E1+2*64 kbps. From the figure the resulting calculated values can be seen for different distances, number of hops etc, within the given parameter requirements.

FIG. 7 is a table showing an embodiment wherein $N_{hop}$ is fixed. For $N_{hop} = 3$ it can be seen from the tables of FIG. 6, FIG. 7 that $T_{frame} = 2.5$ ms is enough for a total link distance up to 60 km and that $T_{frame} = 2$ ms is enough for a total link distance up to 80 km. $T_{frame} > 2.5$ ms can not support three hops for 60 km and $T_{frame} < 2$ ms is less efficient than 2 ms. The bit-rates loser than 8.32 Mbps (in parenthesis in FIG. 7) can not support 4*E1+2*64 kbps.

Figure 8:
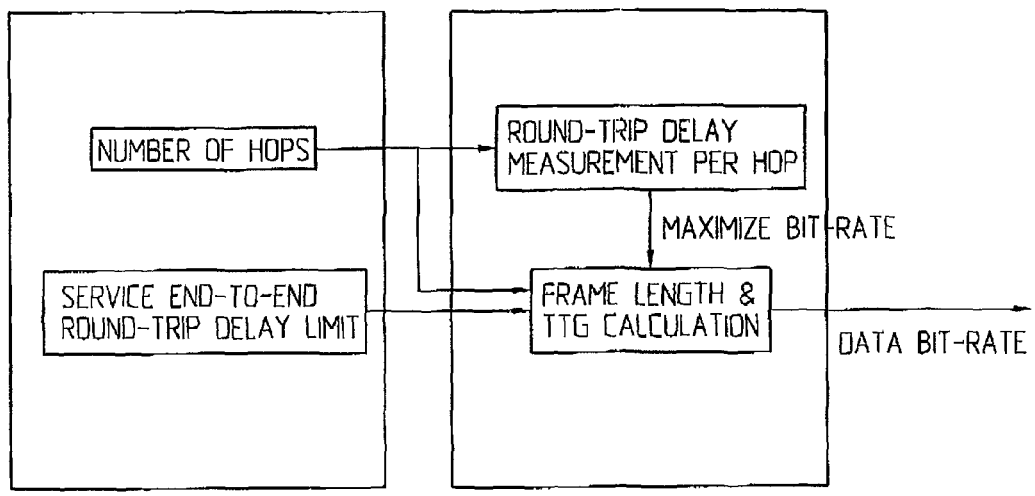
FIG. 8 is a block diagram showing an embodiment wherein the parameters numbers of hops, service end-to-end roundtrip delay are given and the frame length can be set to maximize the data bit-rate.

FIG. 8 is a block diagram describing one embodiment in which the number of hops is given as well as the end-to-end roundtrip delay limit for the specific service. This can be done before installation or after installation. Here, with information about the number of hops, the roundtrip delay can be measured per hop and for maximizing the data bit-rate, information about the number of hops and the measured roundtrip delay per hop, the framelength and TTG can be calculated so as to give the maximum bit-rate. Some of the calculations can be done during installation or initialization or before installation. Alternatively all or some calculations as well as establishment or input of parameter values are done at the planning stage or before installation.

Figure 9:
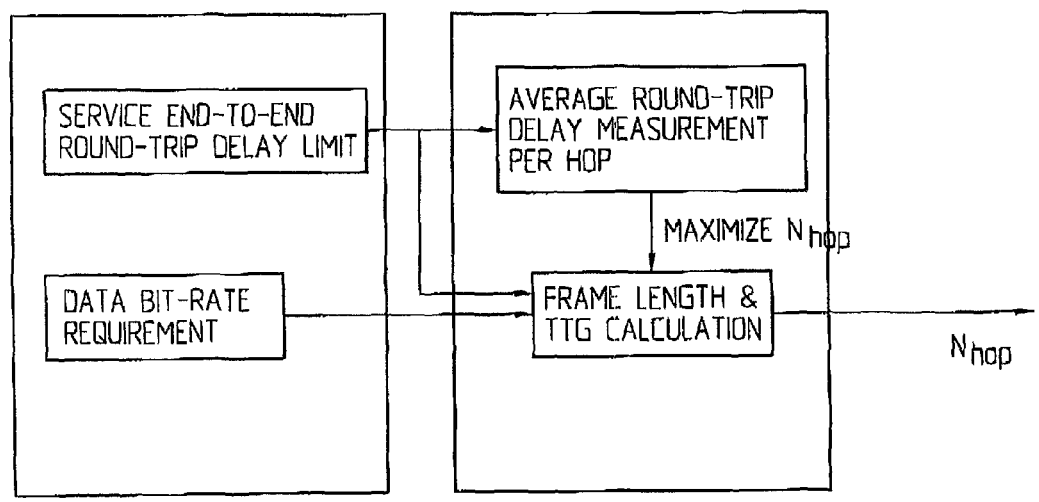
FIG. 9 is a block diagram wherein requirements are given as to bit-rate and delay and wherein the frame length is set such that the number of hops can be maximized.

FIG. 9 shows another implementation in which the initial requirements are a limit concerning the end-to-end roundtrip delay for the specific service and a requirement as far as the data bit-rate is concerned. The limit concerning the end-to-end roundtrip delay is used to determine the average roundtrip delay per hop (measured), and with the information about the service end-to-end roundtrip delay limit, the requirement as far as the data bit-rate is concerned, and the measured average roundtrip delay, the frame length and the TTG can be calculated such that the number of hops $N_{hop}$ is maximized.

Figure 10:
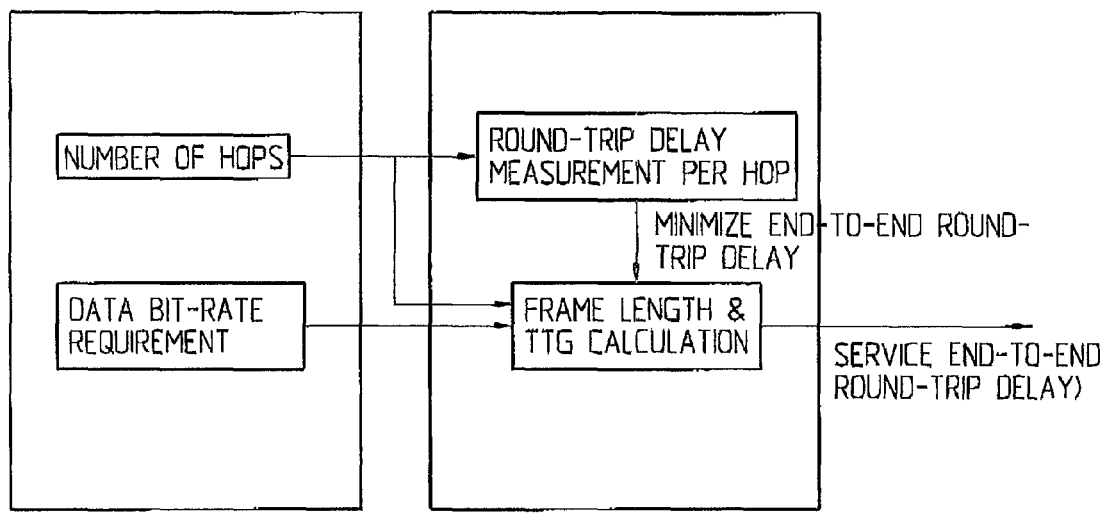
FIG. 10 shows an embodiment wherein there are requirements as to the number of hops and the data bit-rate and wherein the end-to-end delay can be minimized.

FIG. 10 shows another implementation in which a number of hops is given as well as a requirement is set as far as the data bit-rate is concerned. Again the number of hops is used and the roundtrip delay measurement is done per hop. In order to minimize the end-to-end roundtrip delay, the frame length and the TTG are calculated using information about the number of hops, the data bit-rate requirement and the measured roundtrip delay. Hence, the minimum end-to-end roundtrip delay for the particular service is calculated for the given requirements on the parameters, number of hops and data bit-rate. In all embodiments this can be done before installation (e.g. during network planning), during installation or at the initialization, all measures or only some of them.

It should be clear that the invention is not limited to the specifically illustrated embodiments but that it can be varied in a number of ways within the scope of the appended claims.

Particularly it is applicable to many different systems, the main thing being that TDD is used and that a transmission link is to be set up between traffic interfaces.

It should also be clear that the requirements may vary a lot, the main thing being that one or more parameters somehow are restricted or have to meet some requirements, that other parameter(s) is/are calculated in order to optimize another parameter.

The invention claimed is:

1. An arrangement for point-to-point transmission in a system implementing time division duplex (TDD) operation, wherein information is sent over communication links in frames divided into time slots, the arrangement comprising:
    a first link end terminal having a receiving/transmitting antenna, a traffic interface, and a first managing interface, wherein the first managing interface is configured to determine distances between the first link end terminal and other link terminals and to adaptively determine and set variable frame lengths on a per link basis based on link parameters of each link;
    a second link end terminal having a receiving/transmitting antenna, a traffic interface, and a second managing interface, wherein the second managing interface is configured to determine distances between the second link terminal and other link terminals and to adaptively determine and set variable frame lengths on a per link basis based on link parameters of each link; and
    a multi-hop communication link between the first link end terminal and the second link end terminal;
    wherein, when a given service utilizing the multi-hop communication link has a maximum allowable roundtrip end-to-end delay and a maximum allowable number of hops, the arrangement is configured to set the frame lengths to maximize the data bit-rate while satisfying the maximum allowable roundtrip end-to-end delay and the maximum allowable number of hops for the given service.

2. The arrangement according to claim 1, wherein the arrangement is further configured to determine the hop lengths of a number of serial hops required to cover the distance between the first and second link terminals, and to determine the minimum frame transmission/reception transition gap (TTG) or receiving/transmission transition gap (RTG) of each frame.

3. The arrangement according to claim 1, wherein each frame comprises a number of time slots and wherein the arrangement is configured to vary the frame length by varying the number of time slots in the frame.

4. The arrangement according to claim 1, wherein each frame comprises a number of time slots, and each time slot comprises a number of symbols, wherein the arrangement is further configured to vary the frame length by varying the number of symbols in each time slot or in each frame.

5. The arrangement according to claim 1, wherein the frame lengths are substantially continuously variable.

6. The arrangement according to claim 1, wherein the communication links are implemented as one of microwave links, millimeter wave links, and optical links.

7. The arrangement according to claim 1, wherein the traffic interface consists of one of a Synchronous Digital Hierarchy (SDH) interface and a Synchronous Transport Module (STM) interface.

8. The arrangement according to claim 1, wherein the arrangement is further configured to vary the length of a Transmission/Reception Transition Gap (TTG) a Reception/Transmission Transition Gap (RTG), or both to vary the frame length.

9. The arrangement according to claim 1, wherein at least one of the first and second link terminals is a radio base station.

10. The arrangement according to claim 1, adapted for use in wireless transmission in a Third Generation (3G) system.

11. An arrangement for point-to-point transmission in a system implementing time division duplex (TDD) operation, wherein information is sent over communication links in frames divided into time slots, the arrangement comprising:
    a first link terminal having a receiving/transmitting antenna, a traffic interface, and a first managing interface, wherein the first managing interface is configured to determine distances between the first link terminal and other link terminals and to adaptively determine and set variable frame lengths on a per link basis based on link parameters of each link;
    a second link terminal having a receiving/transmitting antenna, a traffic interface, and a second managing interface, wherein the second managing interface is configured to determine distances between the second link terminal and other link terminals and to adaptively determine and set variable frame lengths on a per link basis based on link parameters of each link; and
    a multi-hop communication link between the first link end terminal and the second link end terminal;
    wherein, when a given service utilizing the multi-hop communication link has a maximum allowable roundtrip end-to-end delay and a minimum acceptable data bit-rate, the arrangement is configured to set the frame lengths to maximize the supported number of hops while satisfying the maximum allowable roundtrip end-to-end delay and the minimum acceptable data bit-rate for the given service.

12. An arrangement for point-to-point transmission in a system implementing time division duplex (TDD) operation, wherein information is sent over communication links in frames divided into time slots, the arrangement comprising:
    a first link terminal having a receiving/transmitting antenna, a traffic interface, and a first managing interface, wherein the first managing interface is configured to determine distances between the first link terminal and other link terminals and to adaptively determine and set variable frame lengths on a per link basis based on link parameters of each link;
    a second link terminal having a receiving/transmitting antenna, a traffic interface, and a second managing interface, wherein the second managing interface is configured to determine distances between the second link terminal and other link terminals and to adaptively determine and set variable frame lengths on a per link basis based on link parameters of each link; and a multi-hop communication link between the first link end terminal and the second link end terminal;

wherein, when a given service utilizing the multi-hop communication link has a maximum allowable number of hops and a minimum acceptable data bit-rate, the arrangement is configured to set the frame lengths to minimize the roundtrip end-to-end delay while satisfying the maximum allowable number of hops and the minimum acceptable data bit-rate for the given service.

* * * * *